April 17, 1928.
J. F. KEY
1,666,419
PISTON PRESSURE GAUGE
Filed April 1, 1925
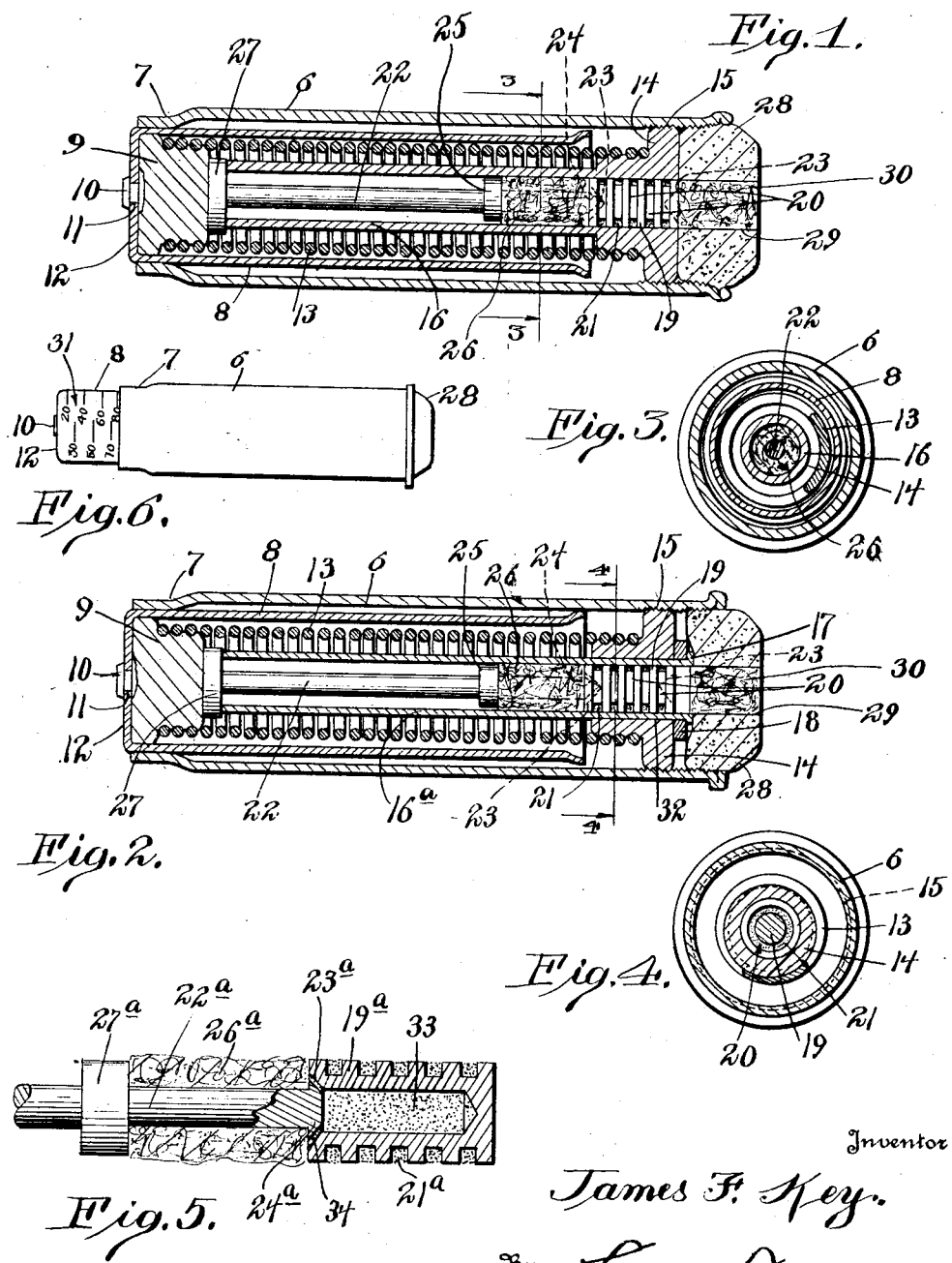
Inventor
James F. Key.
By Lyon & Lyon
Attorneys Patented Apr. 17, 1928.

1,666,419

UNITED STATES PATENT OFFICE.

JAMES F. KEY, OF SIERRA MADRE, CALIFORNIA, ASSIGNOR TO FIRST TRUST & SAVINGS BANK OF PASADENA. TRUSTEE, OF PASADENA, CALIFORNIA.

PISTON-PRESSURE GAUGE.

Application filed April 1, 1925. Serial No. 19,815.

This invention relates to air gauges of the type useful for ascertaining the air pressure in pneumatic tires, and an object of the invention is to provide an air gauge that will not deteriorate as rapidly as those now in use.

Another object is to provide an air gauge having a piston for operating the pressure-indicating plunger.

Another object is to make provision for cleaning the walls of the cylinder in advance of the outward stroke of the piston so as to avoid the entrance of grit between the piston and cylinder wall, for such grit would tend to score the cylinder wall and thus entail leakage of the air past the piston. Such leakage of air would make the reading of the gauge unreliable.

A further object is to so construct a portion of the gauge that such portion can be used in the form of an attachment that can be substituted for the rubber tube employed in a well known type of air gauge for actuating the pressure-indicating plunger. By employing a piston the gauge will accurately function for a much longer period of time than if a rubber tube be employed, hence the great advantage of the piston type of gauge.

The accompanying drawings illustrate the invention:

Fig. 1 is a longitudinal section of an air gauge embodying the invention.

Fig. 2 is a longitudinal section of an air gauge embodying the invention, having a modification of the cylinder and spring seat.

Fig. 3 is a transverse section on the line indicated by the line 3—3, Fig. 1.

Fig. 4 is a transverse section on the line indicated by 4—4, Fig. 2.

Fig. 5 is a fragmental view, partly in section, of a modified form of piston.

Fig. 6 is a reduced side elevation of the air gauge, the plunger being projected to a slight extent from the barrel.

The barrel or case of the gauge is indicated at 6 and is of tubular construction contracted slightly at one end, as indicated at 7, to form an annular guide for a hollow plunger 8 which is thus slidably mounted in the barrel 6.

The plunger 8 is normally held with its outer end substantially flush with the contracted end 7 of the barrel, as in the drawings, and to effect this result a spring seat 9 is fastened to the outer end of the plunger 8 in any suitable manner. In this instance the fastening is effected by a stud 10 projecting from the seat 9 through a hole 11 in the head 12 of the plunger 8, said stud being headed over on the outer face of the head 12. Connected with the seat 9 is one end of a coil spring 13 and the other end of said spring connects with a second spring seat 14. The spring seat 14 is fixed in the barrel 6, preferably being screw threaded into said barrel as indicated at 15. Thus, by removing the spring seat 14, the spring 13, spring seat 9 and plunger 8 will be withdrawn from the barrel.

In Fig. 1 a cylinder 16 is formed integral with the spring seat 14 and projects from the inner end of said spring seat 14 to within a slight distance of the spring seat 9 when the plunger 8 is telescoped within the barrel 6. This is the construction employed for gauges that are entirely new.

In Fig. 2, the cylinder 16ª is somewhat modified as, instead of being integral with the spring seat 14, it is of separate construction from the spring seat 14 and extends through the bore 32 of said seat and is provided with an external shoulder 17 that overlaps the outer face of the spring seat 14 to limit inward motion of the cylinder 16ª with respect to said spring seat. In this instance there is a washer 18 between the shoulder 17 and spring seat 14, though it is to be understood that this washer may be omitted.

Within the cylinder 16 or 16ª, as the case may be, is a piston 19 constructed of any suitable material, for example it may be constructed in whole or in part of graphite. In the present instance the body of the piston 19 is of metal and is provided with annular grooves 20 which are filled with graphite indicated at 21.

The piston rod is indicated at 22 and, preferably, said rod loosely engages the piston 19 instead of being secured thereto so that any deflection of the rod 22 will not cause lateral pressure of the piston against one side of the cylinder. In the present instance the piston 19 is provided in its ends with concavities 23, in one of which seats a conical end 24 of the rod 22. Between said conical end and an annular shoulder 25 on the rod 22 is a swab 26 of felt or other relatively soft material that surrounds the rod and fits the cylinder so as to wipe any grit that may be on the wall of said cylinder therefrom in advance of the outward stroke of the piston. The piston may be turned end for end as it will operate equally as well either way.

The rod 22 is provided at the end opposite to the conical end 24 with a shoulder 27 which limits inward motion of said rod, and the outer end of the rod engages the inner face of the spring seat 9 so as to cause the plunger 8 to move outward with the rod 22 when the piston is actuated on its out stroke against the tension of the spring 13. Inserted in the barrel 6 is a resilient sealing member 28 having an opening 29 alined with the cylinder 16 or 16ª, as the case may be, to admit compressed air to the cylinder to effect such movement of the piston as will move the plunger 8 out of the barrel. It is preferable that the opening 29 be filled with fibrous material 30, as such material will act as a strainer to prevent the entrance of dirt to the adjacent end of the cylinder behind the piston. The fibrous material may be felt, for example.

The barrel 8 may have a graduated scale, as indicated at 31, in the customary manner of graduating air gauges.

In practice, to use the invention, the sealing member 28 will be applied, for example, to the valve stem of a pneumatic tire, so that the opening 30 will communicate with the bore of the valve stem. The pressure of the felt 30 upon the valve will open said valve and permit compressed air from the tire to enter the cylinder 16 or 16ª, as the case may be, behind the piston 19. Dependent upon the pressure of the air, the piston will be forced outwardly to a greater or less extent against the tension of the spring 13 and the scale 31 will indicate the amount of said air pressure in whatever unit of measurement has been adopted for the scale 31.

In Fig. 5 is shown a modified form of piston that can be employed in place of the one hereinbefore described. The parts of this piston that functionally correspond with the elements above described are indicated by the same reference characters with the addition of the letter "a". In this instance the piston 19ª is chambered and contains graphite 33, and the conical end 24ª closes the open end of the piston chamber. When the gauge is removed from the stem of the air valve, in testing the air pressure as described above, the spring will return the piston and its rod quickly and when the shoulder 27ª reaches the cylinder the rod 22ª will stop and the inertia of the moving piston will move it slightly from the conical end 24ª, thus permitting some of the graphite 33 to escape into the cylinder to lubricate it. It may be desirable to provide notches 34 in the periphery of the conical end 24ª to permit of the escape of some of the graphite 33.

I claim:

1. An air gauge comprising a barrel, a hollow plunger slidably mounted in the barrel and having a head, a coil spring means connecting one end of the spring to the barrel, means connecting the other end of the spring to the plunger, a cylinder inside of the plunger rigid with the barrel, a piston in the cylinder, a piston rod between the piston and plunger head, a swab on the piston rod, and a sealing member in the end of the barrel adjacent the piston, and having an opening communicating with the bore of the cylinder.

2. The air gauge piston described comprising a cylindrical body having annular grooves, and graphite in said grooves.

3. The air gauge piston described comprising a chambered body open at one end, a rod having one end loosely fitting the open end of the chamber, and graphite in said chamber.

4. The air gauge piston described comprising a chambered body open at one end and provided with annular grooves, a rod having one end engaging the body, and graphite in the grooves and in the chamber, and there being notches in said end of the rod to permit escape of graphite from the chamber.

5. The air gauge piston described comprising a body non-expandible by pressure of the operating fluid, a rod having one end engaging said body, a swab of soft material surrounding the rod adjacent to said body, and a means to hold the swab against endwise movement relative to said rod.

6. The air gauge piston described comprising a body non-expandible by pressure of the operating fluid, a rod having one end loosely engaging said body, a swab of soft material surrounding the rod adjacent to said body, and a means to hold the swab against endwise movement relative to said rod.

7. A piston pressure gauge comprising a cylinder, an unyielding body slidably fitting in the cylinder, a rod having one end engaging said body, a spring opposing the motion of the body in one direction, a swab of soft material surrounding the rod adjacent to said body, and a means to hold the swab against endwise movement relative to said rod, and means to admit fluid pressure to the cylinder to move the body in said direction.

8. A piston pressure gauge comprising a cylinder, an unyielding body slidably fitting in the cylinder, a rod having one end loosely engaging said body, a spring opposing the motion of the body in one direction, a swab of soft material surrounding the rod adjacent to said body, and a means to hold the swab against endwise movement relative to said rod, and means to admit fluid pressure to the cylinder to move the body in said direction.

9. A piston pressure gauge comprising a cylinder, a piston slidably fitting in the cylinder, said piston formed at least in part by graphite, a rod having one end engaging said piston, a swab of soft material surrounding the rod adjacent to said body, and a means to hold the swab against endwise movement relative to said rod, a spring opposing motion of the piston and rod in one direction, and a means to admit fluid pressure to the cylinder to move the piston body in said direction.

10. A piston pressure gauge comprising a cylinder, a piston slidably fitting in the cylinder, said piston formed at least in part by graphite, a rod having one end loosely engaging said piston, a swab of soft material surrounding the rod adjacent to said body, and a means to hold the swab against endwise movement relative to said rod, a spring opposing motion of the piston and rod in one direction, and a means to admit fluid pressure to the cylinder to move the piston body in said direction.

Signed at Los Angeles, California, this 26th day of March, 1925.

JAMES F. KEY.